US011374393B2

(12) United States Patent
Chin et al.

(10) Patent No.: US 11,374,393 B2
(45) Date of Patent: Jun. 28, 2022

(54) DEPLETION MODE MOSFET FOR OVERCURRENT PROTECTION

(71) Applicant: Littelfuse, Inc., Chicago, IL (US)

(72) Inventors: Jeff Chin, Taipei (TW); Neil LeJeune, Greensburg, PA (US); Orware Liu, Taipei (TW); Teddy To, Tsuen Wan (HK)

(73) Assignee: Littelfuse, Inc., Chicago, IL (US)

(*) Notice: Subject to any disclaimer, the term of this patent is extended or adjusted under 35 U.S.C. 154(b) by 0 days.

(21) Appl. No.: 16/916,684

(22) Filed: Jun. 30, 2020

(65) Prior Publication Data

US 2021/0408779 A1 Dec. 30, 2021

(51) Int. Cl.
*H02H 3/00* (2006.01)
*H02H 7/00* (2006.01)
*H02H 9/02* (2006.01)
*H02H 3/08* (2006.01)
*H02H 3/02* (2006.01)

(52) U.S. Cl.
CPC .............. *H02H 3/08* (2013.01); *H02H 3/025* (2013.01)

(58) Field of Classification Search
CPC ................................. H02H 3/08; H02H 3/025
USPC ......................................................... 361/101
See application file for complete search history.

(56) References Cited

U.S. PATENT DOCUMENTS

| | | | | |
|---|---|---|---|---|
| 6,181,541 B1* | 1/2001 | Souri | ...................... | H02H 3/025 361/101 |
| 9,197,056 B2* | 11/2015 | Liu | .......................... | H02H 9/02 |
| 2002/0079865 A1* | 6/2002 | Thomas | ................ | H02J 7/0029 320/136 |
| 2006/0104004 A1* | 5/2006 | Harris | ..................... | H02H 5/042 361/124 |
| 2007/0210893 A1 | 9/2007 | Hasunuma et al. | | |
| 2008/0137249 A1 | 6/2008 | Harris | | |
| 2018/0286854 A1 | 10/2018 | Rose et al. | | |
| 2018/0375323 A1* | 12/2018 | Eberts | .................... | B64D 45/02 |

FOREIGN PATENT DOCUMENTS

CN 106249800 A 12/2016

OTHER PUBLICATIONS

European Search Report dated Nov. 17, 2021 for EPO Application No. 21178267.7.

* cited by examiner

*Primary Examiner* — Jared Fureman
*Assistant Examiner* — Lucy M Thomas
(74) *Attorney, Agent, or Firm* — KDB Firm PLLC

(57) ABSTRACT

Circuits for providing overcurrent protection are disclosed herein. The circuits feature depletion mode MOSFETs connected to resistive elements, preferably, Positive Temperature Coefficient (PTC) devices, configured in such a way so that the voltage across the PTC device is the same as the gate-to-source voltage of the MOSFET. The circuit may further be configured using a TVS diode, for clamping the drain-to-source voltage of the MOSFET during the overcurrent events. Heat transfer between the MOSFET and the PTC device facilitates overcurrent protection. A two-terminal device including a depletion mode MOSFET, a PTC device, and a TVS diode may provide overcurrent protection to other circuits. A bidirectional circuit c including two MOSFETS disposed on either side of a PTC is also contemplated for AC voltage overcurrent protection.

3 Claims, 15 Drawing Sheets

800 ⤴

| PART | $V_{DS}$ | $V_{GS}$ STABLE | $I_S$ | TVS $V_C$ |
|---|---|---|---|---|
| RXEF375 PTC | 60V | -0.5V | 13.5A | 41.2V |
| 0 OHM RESISTOR | 33.8V | -0V | 26.3A | 43.2V |

MOSFET TRANSIENT POWER

850 ⤴

| PART | $V_{DS}$ | $I_S$ | MOSFET POWER |
|---|---|---|---|
| RXEF375 PTC | 60V | 13.5A | 810W |
| 0 OHM RESISTOR | 33.8V | 26.3A | 889W |

FIG. 8

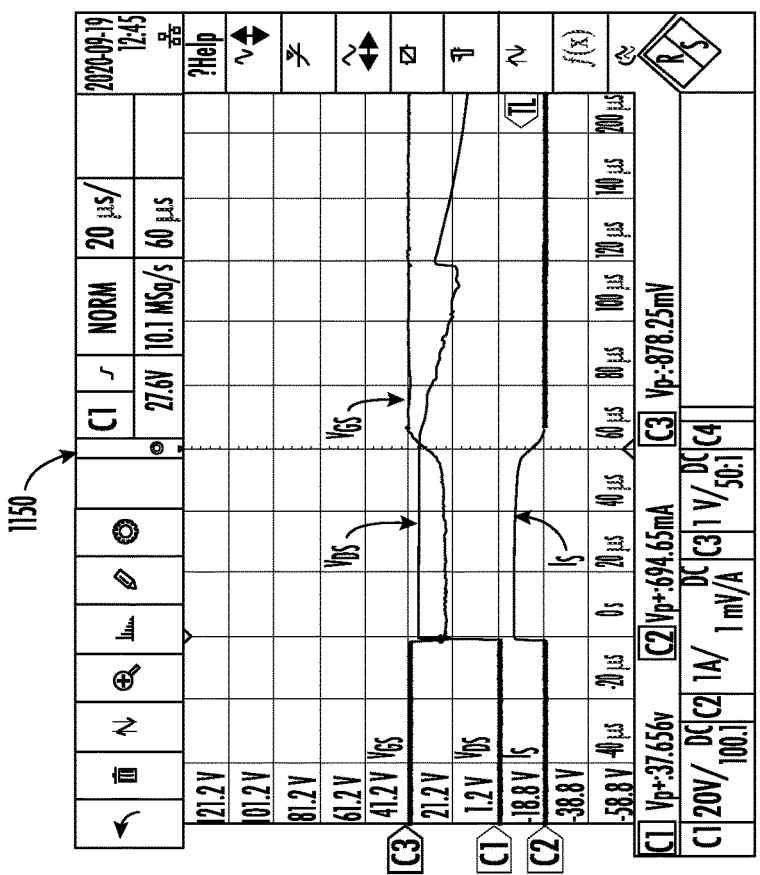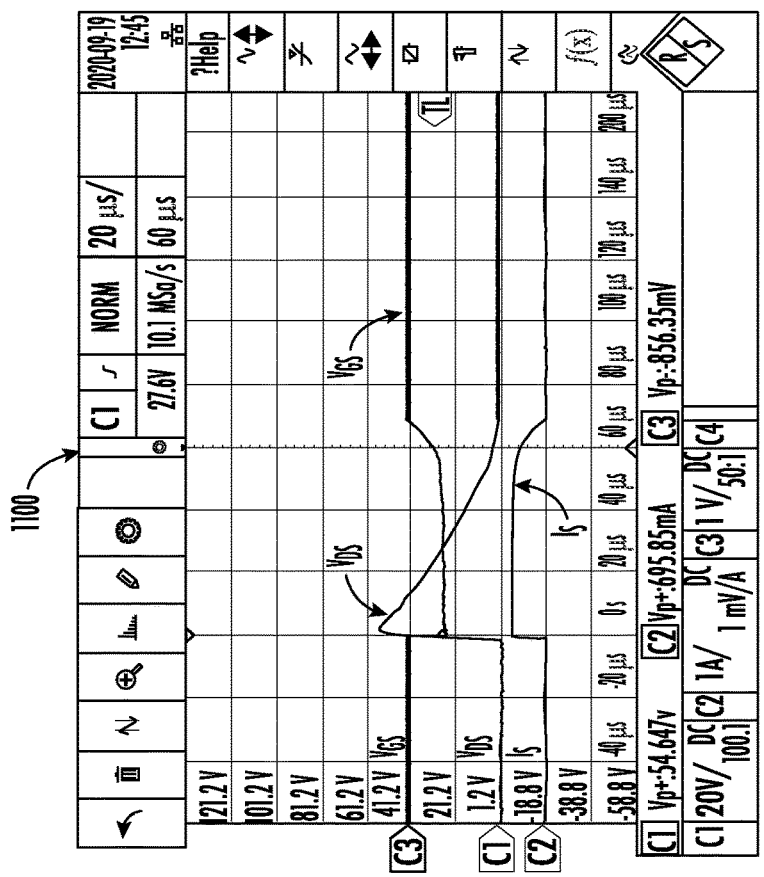
FIG. 11

DEPLETION MODE MOSFET FOR OVERCURRENT PROTECTION

BACKGROUND

Overcurrent or excess current is a situation in which a larger than intended electrical current flows through a circuit. Overcurrent may be constant or transient in nature. Voltage transients, short duration surges of electrical energy, are the result of the sudden release of energy previously stored or induced by other means, such as heavy inductive loads or lightning. Repeatable transients are frequently caused by the operation of motors, generators, or the switching of reactive circuit components. Random transients, may be caused by lightning and Electrostatic Discharge (ESD).

Component miniaturization has resulted in increased sensitivity to electrical stresses. Microprocessors for example, have structures and conductive paths which are unable to handle high currents from ESD transients. Such components operate at very low voltages, so a high priority is given to controlling voltage disturbances to prevent device interruption and latent or catastrophic failures.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a circuit for providing overcurrent protection is disclosed. The circuit includes a metal oxide semiconductor field effect transistor (MOSFET) and a resistive device having two terminals, one terminal being coupled to a source of the MOSFET and a second terminal being coupled to a gate of the MOSFET, where the MOSFET and resistive device protect the circuit during an overcurrent event. In an embodiment, the resistive device is a Positive Temperature Coefficient (PTC) device. In an embodiment, the MOSFET is a depletion mode MOSFET. In an embodiment, the MOSFET is an N-channel depletion mode MOSFET. In one embodiment, the circuit further includes a diode coupled between the second terminal of the resistive device and ground, and the diode clamps a drain-to-source voltage of the MOSFET during the overcurrent event. In an embodiment, the diode is a Transient Voltage Suppression (TVS) diode. In an embodiment, the MOSFET is thermally coupled to the resistive device and, in response to the circuit receiving a surge current, the MOSFET heats up the resistive device. In an embodiment, in response to the circuit receiving a surge current, a near instantaneous increase in a drain-to-source voltage, $V_{DS}$, of the MOSFET is coincident with a near instantaneous decrease in a gate-to-source voltage, $V_{GS}$, of the MOSFET. In an embodiment, the PTC clamps down a surge current and a rise in resistance of the PTC speeds up a blocking capability of the MOSFET. In an embodiment, the MOSFET has a maximum gate-to-source voltage and the PTC has a maximum operating voltage, and the maximum operating voltage does not exceed the maximum gate-to-source voltage.

An exemplary embodiment of a device to be coupled to a circuit for providing overcurrent protection to the circuit is also disclosed. The device includes a depletion mode MOSFET and a resistive device coupled between a source of the MOSFET and a gate of the MOSFET in which a current passing through the device causes a voltage across the resistive device that is equivalent to a gate-to-source voltage of the MOSFET, such that the MOSFET and resistive device protect the circuit during an overcurrent event. In an embodiment, the device also includes a first terminal for coupling to a voltage source of the circuit and a second terminal for coupling to a portion of the circuit to be protected from the overcurrent event. In an embodiment, the resistive device is a PTC device. In an embodiment, the device includes a diode for clamping a drain-to-source voltage, $V_{DS}$, of the MOSFET during the overcurrent protection. In an embodiment, the MOSFET has a maximum gate-to-source voltage and the PTC device has a maximum operating voltage, and the maximum operating voltage does not exceed the maximum gate-to-source voltage. In an embodiment, a voltage across the resistance of the PTC is equal to a gate-to-source voltage, $V_{GS}$, of the MOSFET.

An exemplary embodiment of another circuit for providing overcurrent protection is also disclosed. The circuit includes a MOSFET, a resistive device having two terminals, a first terminal being connected to a source of the MOSFET and a second terminal being connected to a gate of the MOSFET, and a second MOSFET connected to the resistive device, wherein a gate of the second MOSFET is connected to the first terminal and a source of the second MOSFET is connected to the second terminal. In an embodiment, the resistive device is a PTC device. In an embodiment, the circuit also includes a clamping diode to clamp down drain-to-source voltage, $V_{DS}$, across the second MOSFET. In an embodiment, the circuit also includes an AC voltage source. In an embodiment, each MOSFET of the circuit includes an internal diode, such that either of the MOSFETs is conducted with its respective internal diode in reverse mode. In an embodiment, the MOSFET and the second MOSFET are n-channel depletion mode MOSFETs.

BRIEF DESCRIPTION OF THE DRAWINGS

FIG. 8 features two tables resulting from tests performed on the circuit of FIG. 7, in accordance with exemplary embodiments;

FIGS. 11 and 12 are waveforms resulting from tests performed on the circuits of FIGS. 6 and 7, in accordance with exemplary embodiments;

DETAILED DESCRIPTION

Figure 1:
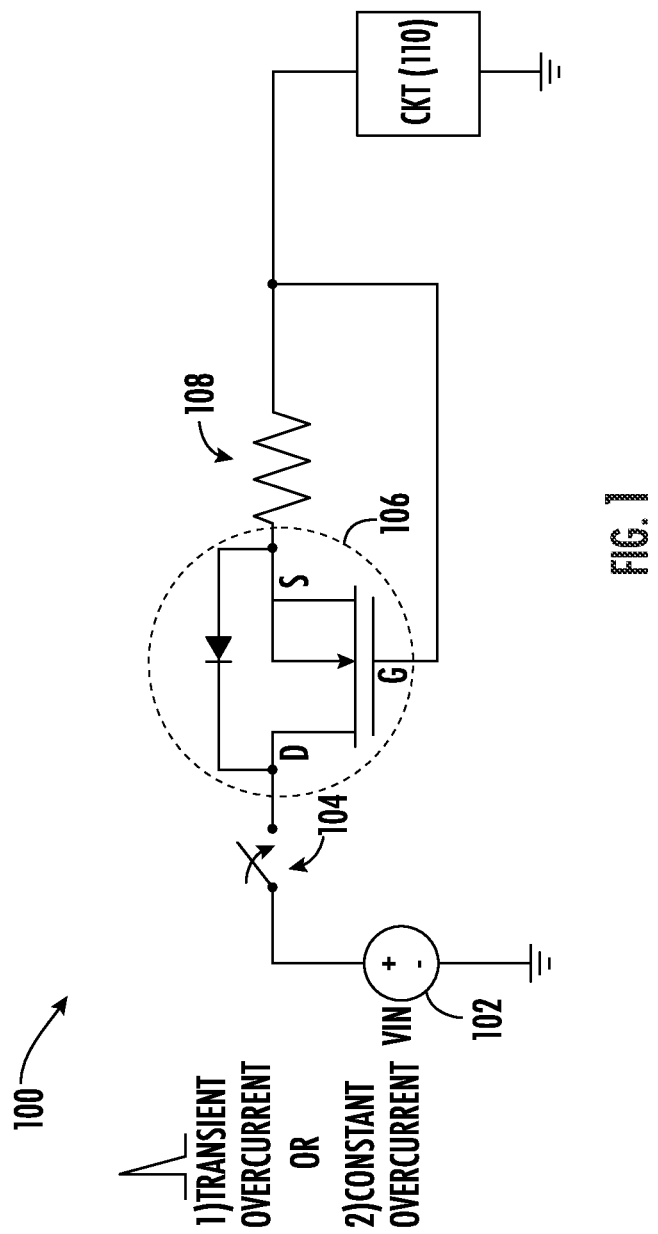
FIG. 1 is a diagram illustrating a circuit for providing overcurrent protection, in accordance with exemplary embodiments.

Several circuits for providing overcurrent protection are disclosed herein. The circuits feature depletion mode MOSFETs connected to resistive elements, including Positive Temperature Coefficient (PTC) devices, configured in such a way so that the voltage across the PTC device is the same as the gate-to-source voltage of the MOSFET. The circuit may further be configured using a Transient Voltage Suppression (TVS) diode, for clamping the drain-to-source voltage of the MOSFET during the overcurrent events. Heat transfer between the MOSFET and the PTC device facilitates overcurrent protection. A two-terminal device including a depletion mode MOSFET, a PTC device, and a TVS diode may provide overcurrent protection to other circuits. A bidirectional circuit including two MOSFETS disposed on either side of a PTC is also contemplated for AC voltage overcurrent protection. In exemplary embodiments, the combination of PTC plus a depletion mode MOSFET are included in circuits to mutually protect one another as current clamper then stopper.

Metal-Oxide Semiconductor Field-Effect Transistor devices, known as MOSFETs, are semiconductor devices used for switching and amplifying electronic signals in electronic devices. By adjusting a voltage on its gate, the width of a channel disposed between the source and drain of the MOSFET is varied. MOSFETs come in a variety of configurations, based on whether they are P-channel devices built with N-type substrates, N-channel devices built with P-type substrates, vertically disposed semiconductors, laterally disposed semiconductors, depletion mode, and enhancement mode.

In contrast to enhancement mode MOSFETs, which are turned on by the application of a voltage across the gate, depletion mode MOSFETs are known as "normally-on" devices when the gate terminal is at zero volts ($V_{GS}$=0V). In addition to having a thin gate oxide between the source and drain regions, a conductive channel is formed beneath the gate oxide layer and between the source and drain regions using ion implantation. The concentration of active dopants in the substrate-to-channel region is used to adjust the threshold voltage ($V_{TH}$) of the MOSFET to a desired value. Despite the name, many modern MOSFETs may be manufactured with a polysilicon gate, rather than metal, atop the insulating gate oxide.

Positive Temperature Coefficient (PTC) devices are made from materials that have an initial resistance that is responsive to temperature. As the temperature of the PTC device increases, its resistance also increases. As current passing through the PTC element increases above a predefined limit, the PTC element may heat up, causing the resistance of the PTC element to increase and dramatically reduce or arrest the flow of current through the protected device. Damage that would otherwise result from unmitigated fault currents flowing through the circuit is thereby prevented. The PTC will return to its low resistance state once the fault current subsides. Thus, PTC devices are sometimes referred to as resettable fuses. Polymeric PTC devices are a particular class of devices made using polymers.

Transient voltage suppressors (TVS) and Zener diodes are both used to absorb excess energy when voltage levels spike above a device's clamping voltage. While Zener diodes are designed to make the voltage more stable, TVS diodes prevent high voltage transients such as surge and ESD events. TVS diodes have a faster response time than Zener diodes, at the nanosecond level, and are able to absorb a higher surge current. Using a TVS diode to protect a circuit, the transient voltage is clamped down to a fixed value to prevent high peak voltage from damaging downstream components of the circuit.

The exemplary embodiments described herein are contemplated with these three devices, MOSFETs, PTCs, and diodes, in mind.

Circuit with Resistor Connected Between Gate and Source of MOSFET

FIG. 1 is a representative drawing of a circuit 100 for providing overcurrent protection, according to exemplary embodiments. The circuit 100 includes a voltage source 102, a switch 104, a depletion mode MOSFET 106, a resistor 108, and a circuit to be protected, denoted CKT 110. When the switch 104 is closed, current flows from the drain (D) of the MOSFET 104 to the source (S), through a channel created by ion implantation. Because it is a depletion mode MOSFET, no gate voltage is necessary to allow the current to flow through the MOSFET 106 ($V_{GS}$=0V). In one embodiment, the MOSFET 106 is an n-channel depletion mode MOSFET. In another embodiment, the MOSFET 106 is a p-channel depletion mode MOSFET. A p-channel depletion mode MOSFET is similar to an n-channel MOSFET except the bias $V_{GS}$ has a reverse direction to that of an n-channel MOSFET in order to pinch off the current flowing through the channel.

The depletion mode MOSFET 106 is connected in series to the resistor 108, with one side (terminal) of the resistor being connected to the source (S) of the MOSFET and the other side (terminal) of the resistor being connected to the gate (G) of the MOSFET. Thus, a voltage across the resistor 108 is equal to the gate-source voltage ($V_{GS}$) of the MOSFET 106. The CKT 110 is connected in series between the resistor 108 and ground.

Figure 2:
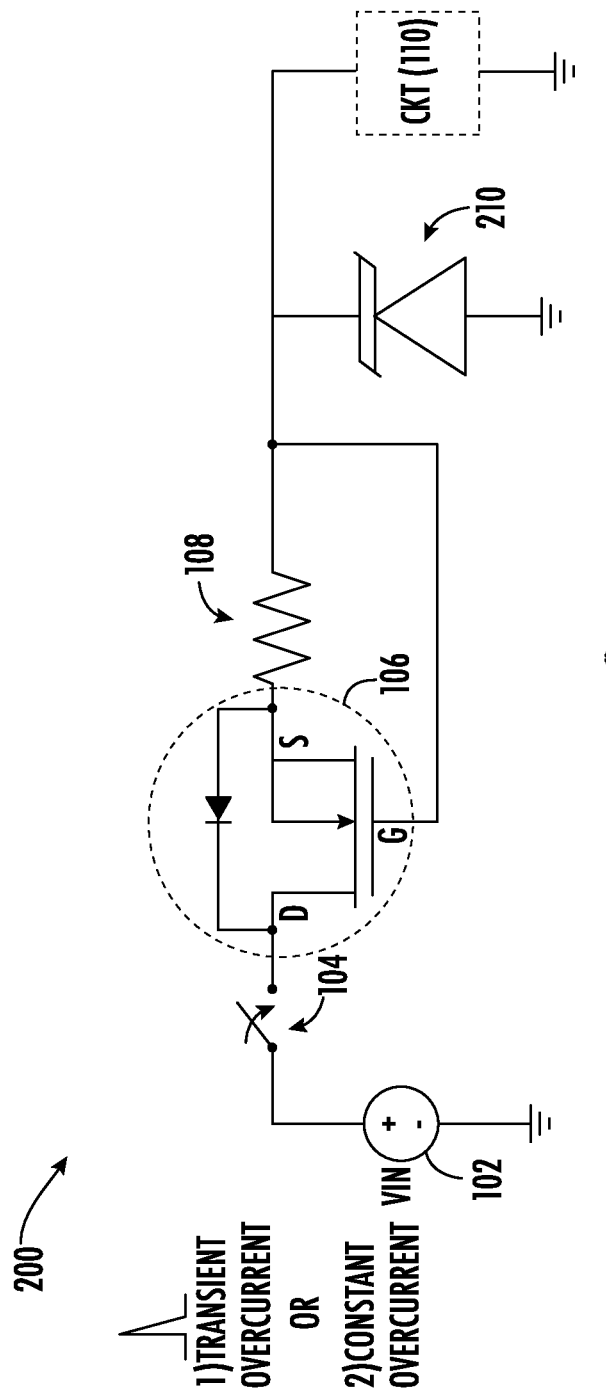
FIG. 2 is a diagram illustrating a circuit for providing overcurrent protection, in accordance with exemplary embodiments.

FIG. 2 is a representative drawing of a circuit 200 for providing overcurrent protection, according to exemplary embodiments. As with the circuit 100, the circuit 200 includes the voltage source 102, switch 104, depletion mode MOSFET 106, and resistor 108. In the circuit 200, the circuit to be protected, CKT 110, is replaced or supplemented with a TVS diode 210. In one embodiment, the MOSFET 206 is an n-channel depletion mode MOSFET.

Because it is a depletion mode device, the MOSFET 106 has a negative threshold voltage, $V_{TH}$. For a depletion mode MOSFET, the channel is fully conductive and current flows strongly between the drain and source when the gate terminal is at 0 volts ($V_{GS}$=0 volts). An increasingly negative bias at the gate of an N-channel MOSFET will reduce conduction in the channel, until finally $-V_{GS}$(off), the device's threshold voltage, $V_{TH}$, is reached, and conduction through the MOSFET ceases.

In between these two time periods (when $V_{GS}$=0 volts and when $V_{GS}$=$-V_{TH}$), the resistance across the channel of the MOSFET 106 will increase. The MOSFET 106 will go to a saturation mode very quickly once the surge current build increases, resulting in the heat dissipation inside the MOSFET.

Both circuits 100 and 200 are analyzed for two types of overcurrent protection: 1) transient overcurrent and 2) constant overcurrent. In exemplary embodiments, the transient and constant overcurrent tests are performed to determine whether the series connection of the resistor 108 between the gate and the source of the depletion mode MOSFET 106 may reduce overcurrent level to release some power dissipation on the depletion mode MOSFET during the overcurrent condition.

To test transient overcurrent, the input voltage 102, $V_{in}$, is specified as X volts with a Y/Zµs surge, for integers X, Y, and Z. For example, overvoltages created by lightning strikes are characterized by a 1.2/50 µs voltage wave, which means that the voltage reaches its maximum voltage (X volts) within 1.2 µs, then decays down to 50% of the maximum voltage (0.5× volts) after 50 µs. In one embodiment, the circuits 100 and 200 are tested for transient overcurrent with X=100, Y=1.2, and Z=50, or 100V with a 1.2/50 µs surge. Alternatively, to test constant overcurrent, the circuits 100 and 200 are fed an input voltage, $V_{in}$, of W volts, for integer W. In one embodiment, the circuits 100 and 200 are tested for constant overcurrent with W=48, or an input voltage, $V_{in}$, of 48V.

For the surge current condition, in an exemplary embodiment, the open circuit voltage is set at 100V and the fictive impedance inside the surge generator is 2 ohms, resulting in a surge current at the peak of 100V/2=50 A. In this embodiment, the surge voltage was intentionally kept at 100V so as to avoid using another TVS diode to clamp down the surge. Further, the test is designed to verify the current limiting function of the depletion mode MOSFET rather than to surge the circuit with a very high voltage. The IXTH16N10D2 depletion mode MOSFET (with $V_{DS}$=100V, $I_{D(on)}$=16 A, $R_{DS(on)}$=6.4 mOhm), manufactured by Littelfuse®, is used in this embodiment.

Figure 3:
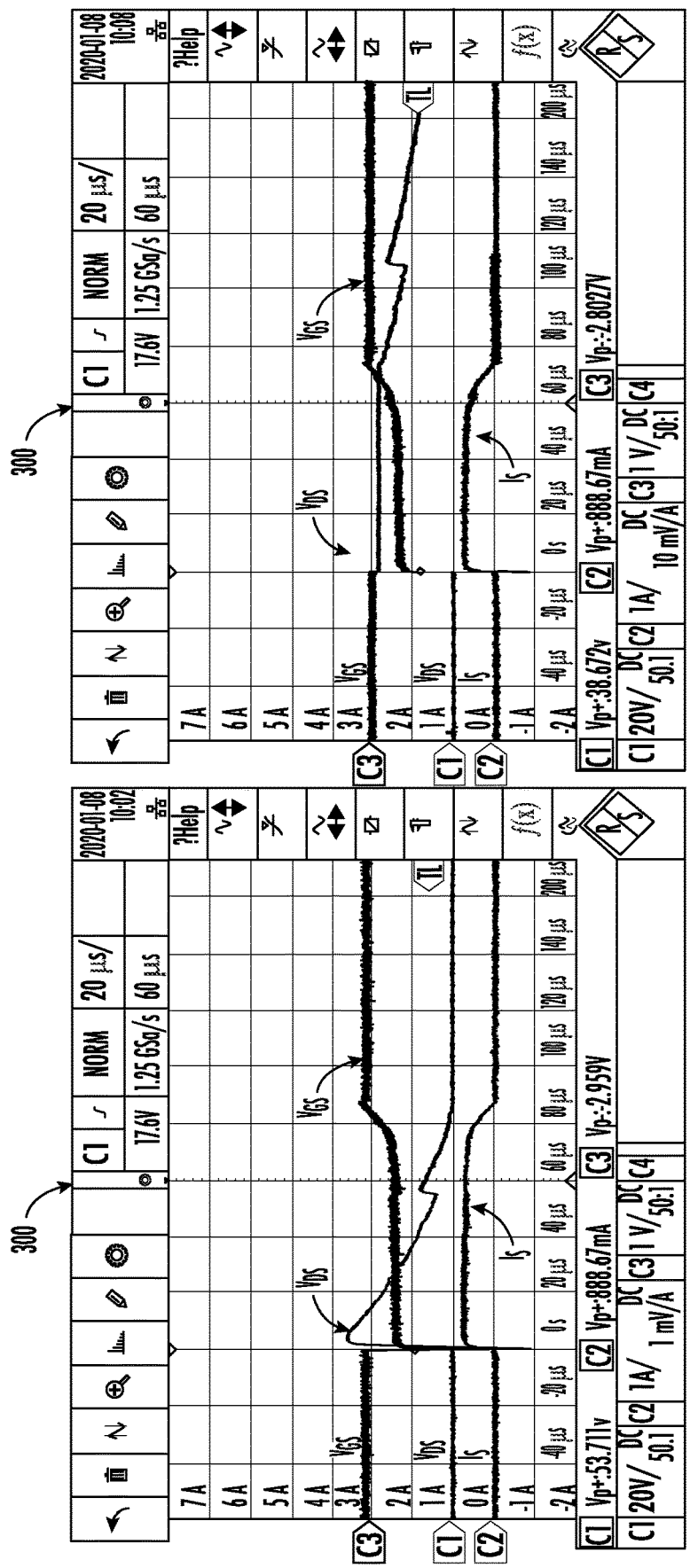
FIGS. 3, 4, and 5 are waveforms resulting from tests performed on the circuits of FIGS. 1 and 2, in accordance with exemplary embodiments.
Figure 4:
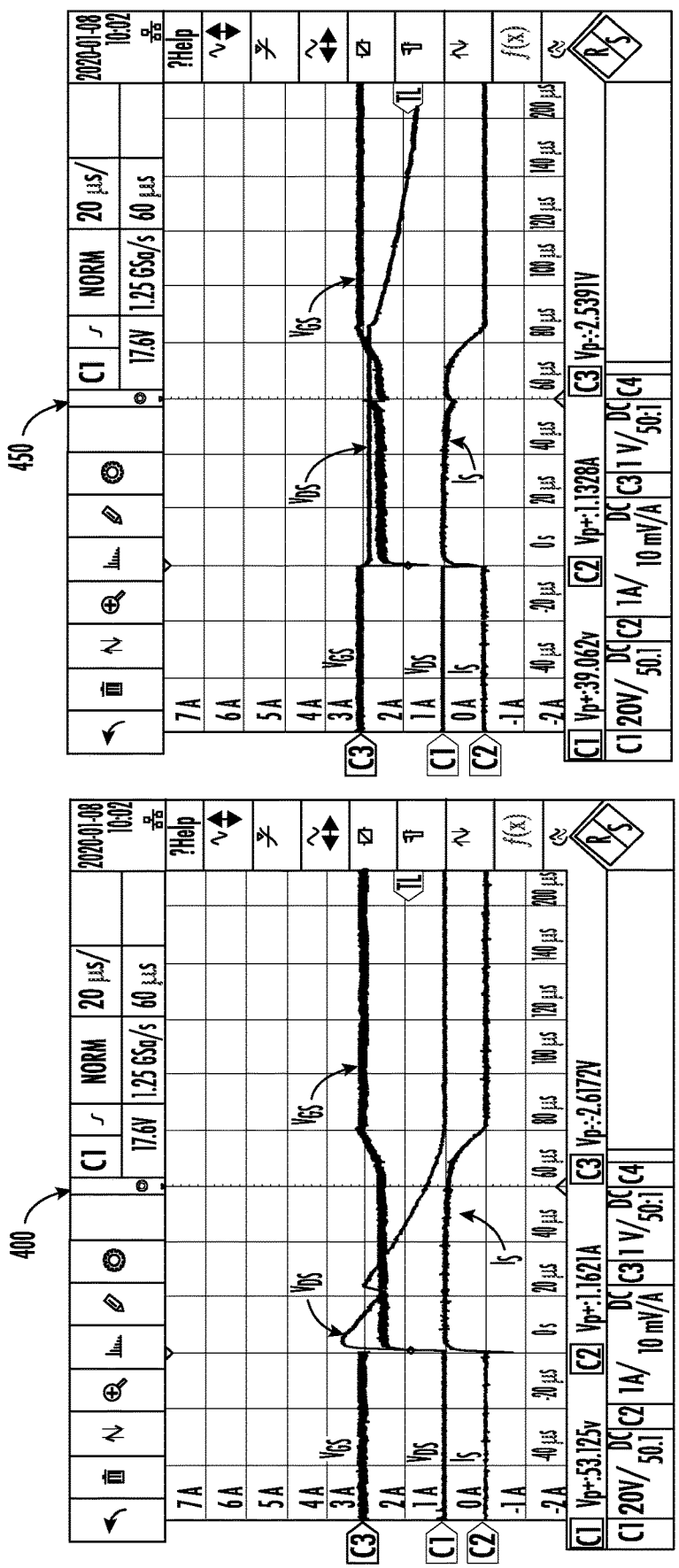
Figure 5:
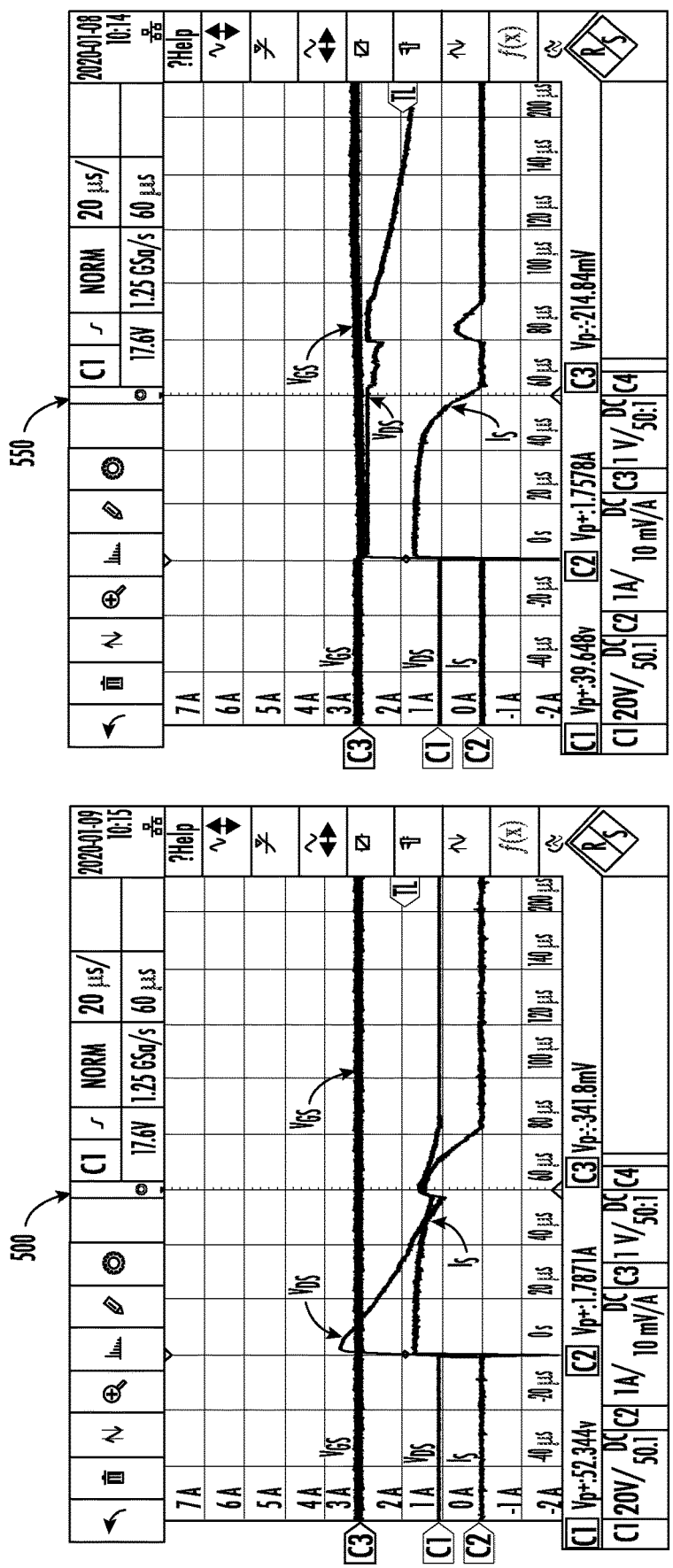

Results of empirical tests performed on the two circuits 100 and 200 are given in the dual waveforms, respectively, of FIGS. 3, 4, and 5, according to exemplary embodiments. In each of the dual waveforms, three parameters are plotted, the drain-to-source voltage ($V_{DS}$) of the MOSFET, the gate-to-source voltage ($V_{GS}$) of the MOSFET 106, and the surge current, $I_S$, resulting from the input voltage, $V_{in}$. Put another way, the voltage across the MOSFET 106 ($V_{DS}$), the voltage across the resistor 108 ($V_{GS}$), resulting from the surge current, Is, are measured. Further, for testing transient overcurrent, the circuits 100 and 200 each receive an input voltage, $V_{in}$, of 100V with a 1.2/50 µs surge. As in all the waveform drawings disclosed herein, $V_{GS}$ and $V_{DS}$ are voltage waveforms while the surge current, $I_S$, is a current waveform. In each waveform presented herein, the major divisions are given at 20 µs intervals.

In FIG. 3, the waveform 300 shows the resulting surge transient, Is, on the circuit 100 (FIG. 1) where the resistor 108 has a resistance of 1 ohm. Looking first at the waveform 300, the surge current, $I_S$, appears at trigger point, T (0 µs). The voltage, $V_{DS}$, increases immediately (~1 µs or less), then decays over about 80 µs. The voltage, $V_{GS}$, drops immediately, then shoots back up, returning back to its original position at about 85 µsec. In the waveform 300, the surge current, Is, lasts about 87 µs.

The second waveform 350 of FIG. 3 shows the resulting surge transient, Is, on the circuit 200 (FIG. 2) where the resistor 108 has a resistance of 1 ohm and the TVS diode 210 is a 30KPA30CA diode, manufactured by Littelfuse®. The 30KPA30CA TVS diode has a maximum clamping voltage, $V_C$, of 55.2V. The surge current, Is, begins at the trigger point, T (0 µs), also causing $V_{DS}$ to increase and $V_{GS}$ to drop, with the duration of the current surge, Is, being about 72 µs. This time, the drain-to-source voltage, $V_{DS}$, is clamped by the TVS diode 210. The presence of the TVS diode 210 also affects the surge current, Is.

Continuing to FIG. 4, waveform 400 shows the result of the surge transient in the circuit 100 where the resistor 108 has a resistance of 0.5 ohms. As before, the voltage between the drain and the source, $V_D$S, increases immediately while the gate-to-source voltage, $V_{GS}$, drops. The surge current, Is, begins at trigger point, T, and again lasts about 80 µs. Waveform 450 shows the result of the surge transient in the circuit 200 where the resistor 108 has a resistance of 0.5 ohms and the 30KPA30CA TVS diode 210 is used. Again, the TVS diode 210 clamps down the voltage, $V_D$S. However, the duration of the surge current, Is, which lasts about 85 µs, is not lowered with the presence of this TVS diode 210.

In FIG. 5, waveform 500, the resistor 108 is removed from the circuit 100 (R=0 ohms). Since the resistor of the circuit 100 is connected between the source and the gate of the MOSFET 106, this means there is no potential difference between the source and gate. In other words, $V_{GS}$=0. Thus, in waveform 500, while the drain-to-source voltage, $V_D$S, (voltage across the MOSFET 106) increases as before, there is no change to the gate-to-source voltage, $V_{GS}$. The surge current, Is, begins at trigger point, T, with a duration of about 84 µs. Waveform 550 shows the result of the surge transient in the circuit 200 with no resistor 108 and the 30KPA30CA TVS diode 210. Here, the duration of the surge current, Is, drops considerably, to about 64 µs, with a small artifact surge occurring thereafter.

The above results illustrate the circuits 100 and 200 receiving a transient overcurrent, such as a current spike, where the input voltage, $V_{in}$, is 100V with a 1.2/50 µs surge. The circuits 100 and 200 may similarly be tested for constant overcurrent where the input voltage, $V_{in}$, is 48V. The empirical results of FIGS. 3, 4, and 5 provide guidance for building a circuit that provides overcurrent suppression.

Circuit with PTC Connected Between Gate and Source of MOSFET

Figure 6:
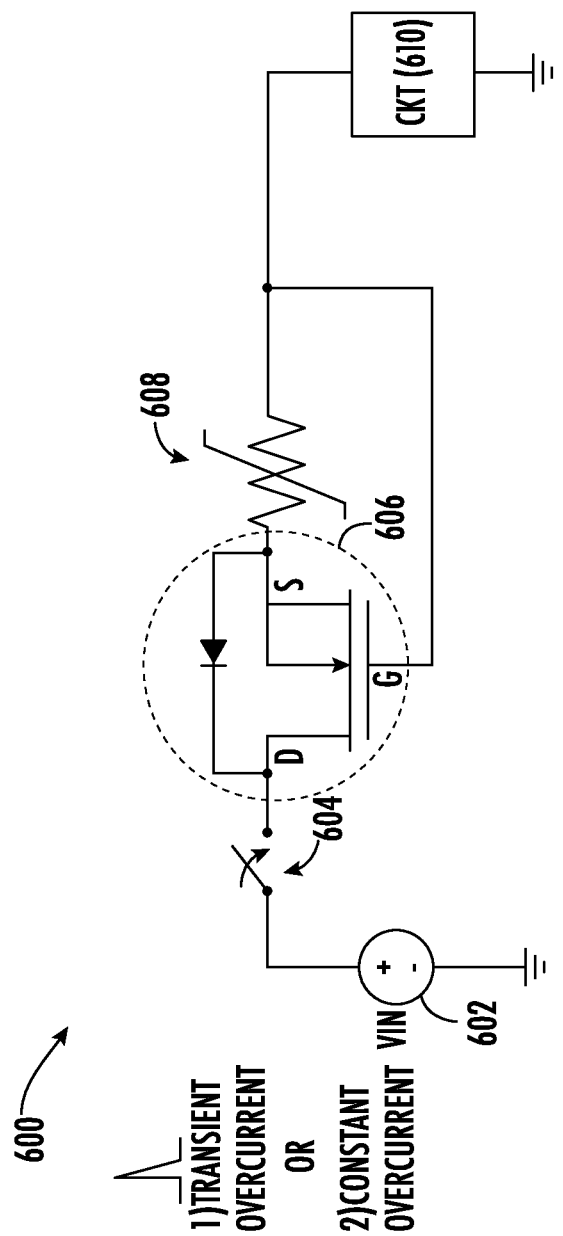
FIG. 6 is a diagram illustrating a circuit for providing overcurrent protection, in accordance with exemplary embodiments.
Figure 7:
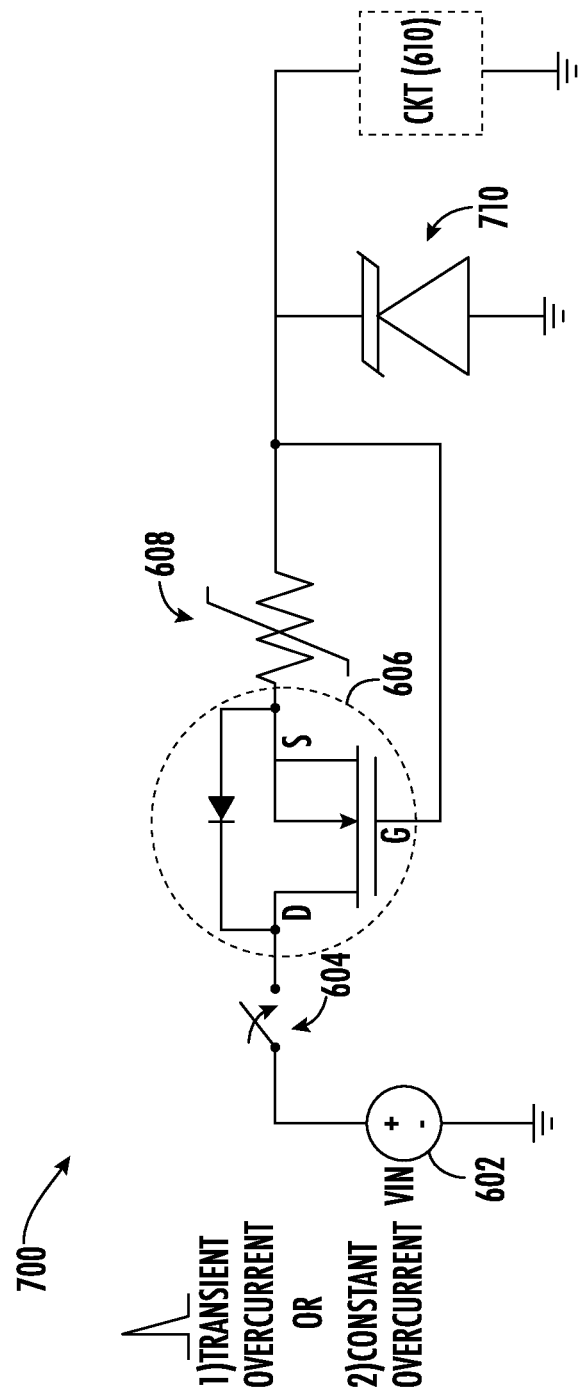
FIG. 7 is a diagram illustrating a circuit for providing overcurrent protection, in accordance with exemplary embodiments.

FIGS. 6 and 7 are representative drawings of circuits 600 and 700, respectively, for providing overcurrent protection, according to exemplary embodiments. The circuit 600 is the same as the circuit 100 (FIG. 1), except the resistor 108 is replaced with a Positive Temperature Coefficient (PTC) device 608. Similarly, the circuit 700 is the same as the circuit 200 (FIG. 2), except the resistor 108 is replaced with the PTC device 608. Again, one side (terminal) of the PTC device 608 is connected to the source of the MOSFET 606 while the other side (terminal) of the PTC device is connected to the gate of the MOSFET. In an exemplary embodiment, the PTC device 608 is a polymeric PTC (PPTC) device.

As with the circuits 100 and 200, when a surge current is applied to the circuit 600 or 700, the MOSFET 606 will heat up quickly. Similarly, the PTC device 608 is designed to increase its resistance as it heats up. As current passing through the PTC device 608, the PTC device temperature increases above a predefined limit, known as its trip point or trip state. This causes the resistance of the PTC device 608 to increases dramatically, which reduce or arrest the flow of current through the PTC.

Further, the placement of the MOSFET 606 and the PTC device 608 next to one another means that, upon receipt of the surge current, the MOSFET will heat up, which will heat up the PTC device faster than if the MOSFET were not present. Thus, in some embodiments, there exists thermal transfer from the MOSFET 606 to the PTC 608, thus accelerating the response of both devices to the surge event.

As the PTC 608 heats up, it becomes more resistant. The PTC 608 has two parameters, holding current, $I_H$, and trip current, $I_T$. As long as the current flowing through the PTC 608 does not exceed its holding current, it will not go to trip state (in which its resistance rises dramatically). However, when the current flowing through the PTC 608 exceeds its trip current value, the resistance of the PTC 608 will rise quickly to further block the current, until a steady state is reached with a very small current flowing to maintain the trip state of the PTC. The PTC will reset to its low resistance state only after the fault current is removed.

FIG. 8 includes two tables 800 and 850 used to illustrate the results of performing a test on the circuit 700 (FIG. 7), in accordance with exemplary embodiments. In this example, the circuit 700 includes the PTC device 708 connected between the source and gate of the MOSFET 706, as well as the TVS diode 710. Both tables provide parameters for two conditions: 1) the PTC 708 is a RXEF375 PTC device, manufactured by Littelfuse® (condition 1); and 2) the PTC 708 is removed from the circuit 700 (condition 2). This is the same as replacing the PTC 708 with a 0 ohm resistor. Put another way, the second condition is simply removing the PTC 708 and tying the source of the MOSFET 706 to the gate.

In this embodiment, the MOSFET 706 is a IXTH16N10D2 D-MOSFET and the TVS diode 710 is the 30KPA30A TVS diode, both manufactured by Littelfuse®. Further, the circuit 700 receives an input voltage, $V_{in}$ of 130V with a 1.2/50 µs surge. Looking at the datasheet for the IXTH16N10D2 MOSFET, its maximum voltage rating for both $V_{DS}$ and $V_{BG}$ is 100V and its maximum rating for voltage, $V_{GS}$, is +/−20V. Thus, with a transient waveform of 1.2/50 µs with peak voltage value at 130V, the MOSFET absorbs the surge energy and allows some let-through voltage. The TVS diode is needed to further clamp down the surge energy.

Table 800 plots the drain-to-source voltage, $V_{DS}$, the gate-to-source voltage, $V_{GS}$, the surge current, $I_S$, and the maximum clamping voltage, $V_C$, of the TVS diode 710, for both the PTC and no-PTC conditions. Table 850 plots the drain-to-source voltage, $V_{DS}$, the surge current, $I_S$, and the MOSFET power, for both the PTC and no-PTC conditions. The tables 800, 850 illustrate that, for surge tests, with the adoption of the PTC 708 in series with the MOSFET 706 and the PTC being connected between the source and gate of the MOSFET, the PTC clamps down the surge level and decreases the surge power dissipation to the MOSFET (condition 1), compared to when the gate is tied directly to the source of the MOSFET (condition 2). Thus, the PTC helps clamp down some of the surge level with heat dissipation, and generates a more negative gate-to-source voltage ($V_{GS}$=−0.5V) to further block the current going through the depletion mode MOSFET.

The results in FIG. 8 provide data on the operation of the circuit 700 when a transient voltage is applied. In an exemplary embodiment, the circuit 700 of FIG. 7 is also used for testing constant overcurrent. Tables 800 and 850 illustrate that having the PTC 608 in place to replace the zero ohm resistance helps to lower the clamping voltage level, $V_C$, of the TVS diode 710. Further, while $V_{DS}$ increases with the presence of the PTC 608, $V_{GS}$, and $I_S$, are also lowered, as is the MOSFET power consumed. For providing transient or constant overcurrent protection, these are promising results.

Figure 9:
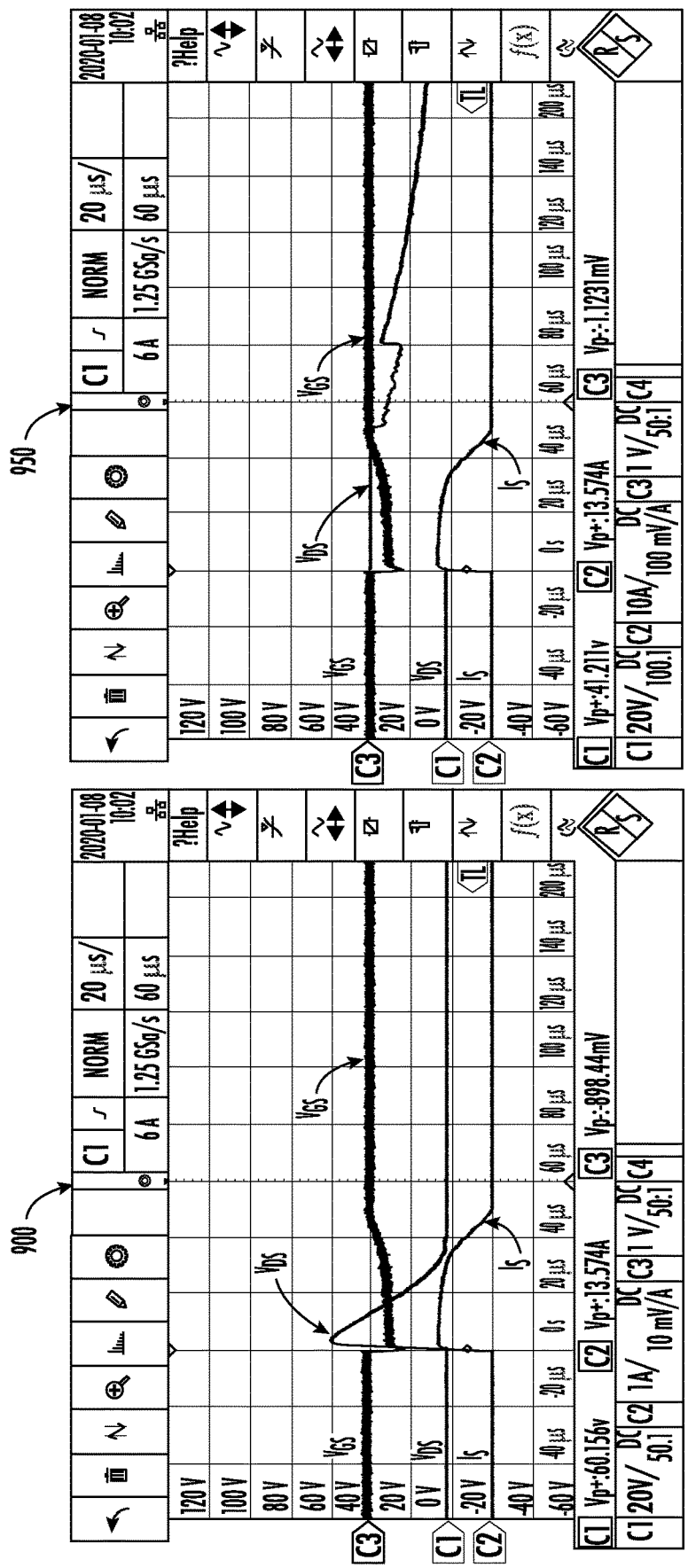
FIGS. 9 and 10 are waveforms resulting from tests performed on the circuits of FIGS. 6 and 7, in accordance with exemplary embodiments.
Figure 10:
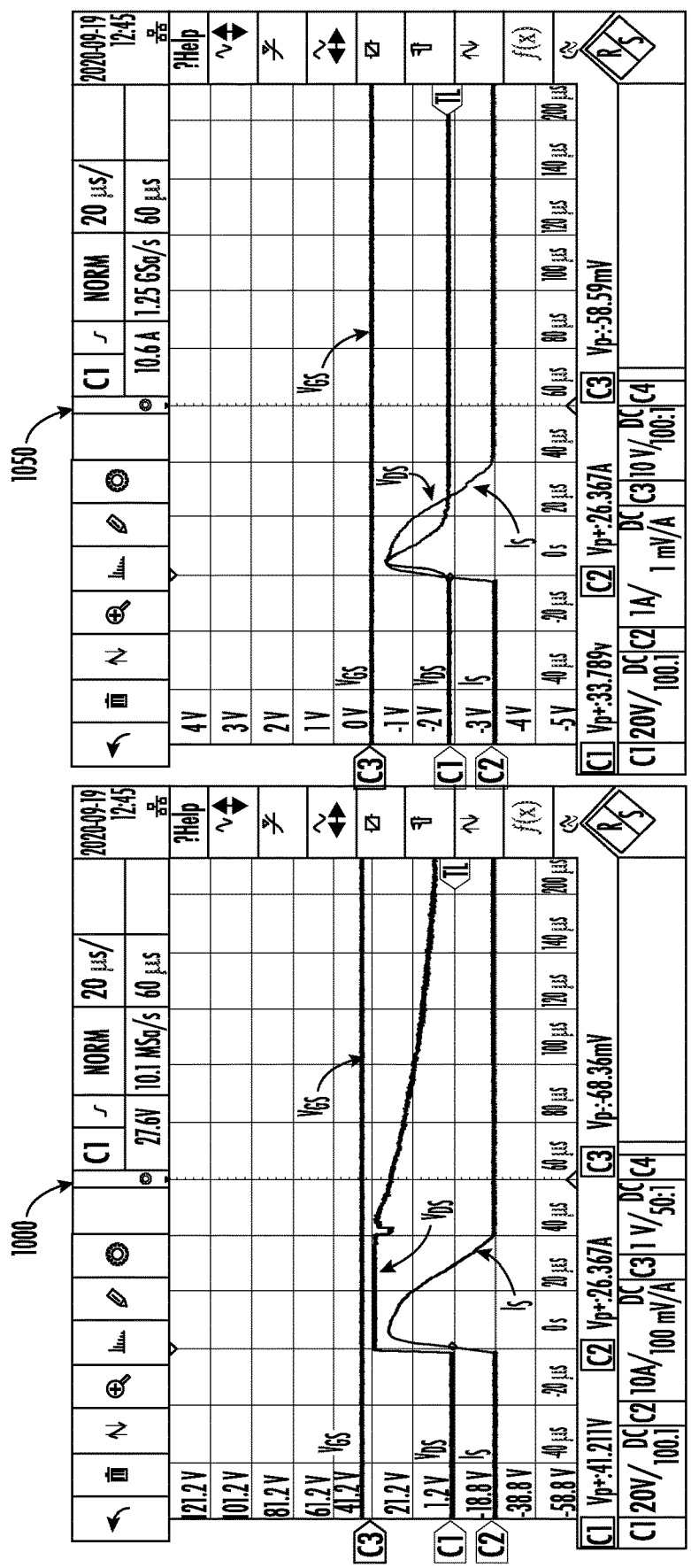

Results of additional empirical tests performed on the circuits 600 and 700 with different PTC devices are given in the dual waveforms, respectively, of FIGS. 9 and 10, according to exemplary embodiments. Each circuit 600 and 700 receives an input voltage, $V_{in}$ of 130V with a 1.2/50 µs surge. Waveform 900 shows the result of applying a surge transient in the circuit 600 where the PTC 608 is an RXEF375 PTC device, also manufactured by Littelfuse®. The RXEF375 device has a trip current, $I_T$, of 7.50 A, a minimum resistance, $R_{MIN}$, of 0.03 ohms, and a maximum resistance, $R_{MAX}$, of 0.05 ohms. As before, the voltage between the drain and the source, $V_{DS}$, increases immediately, heating up the MOSFET 606, while the gate-to-source voltage, $V_{GS}$, drops. In this example, the surge current lasts about 50 µs. Waveform 950 shows the result of the surge transient in the circuit 700 where the PTC 708 is the RXEF375 PTC and the 30KPA30CA TVS diode 710 is used. Again, the duration of the surge current is about 50 µs and, as expected, the drain-to-source voltage the MOSFET channel, $V_DS$, is clamped down by the TVS diode 710. With the help of the RXEF375 PTC 708, the current is clamped at about 13.57 A. The surge waveform, is characterized as a 1.2/50 µs wave with peak voltage of 130V and peak current at 130V/2 ohms=65 A (note that 2 ohms is the fictive impedance of the surge generator network for a 1.2/50 µs waveform). With the help of the RXE375 PTC 708, the current is clamped at about 13.75 A. As before, the thermal effect between the MOSFETs and the respective PTCs in the two circuits help to make the circuits more responsive to the surge currents, in exemplary embodiments.

Continuing to FIG. 10, waveform 1000 shows the result of applying a surge transient in the circuit 600 where the PTC 608 is removed (R=0 ohms). The voltage between the drain and the source, $V_{DS}$, increases immediately while the gate-to-source voltage, $V_{GS}$, is unchanged. The surge current, Is, lasts about 40 µs. Waveform 1050 shows the result of the surge transient in the circuit 700 where the PTC 708 is removed and the 30KPA30CA TVS diode 710 is used. The duration of the surge current, $I_S$, remains at about 40 µs and the drain-to-source voltage the MOSFET channel, $V_{DS}$, is clamped down. With the gate-to-source voltage, $V_{GS}$, of the MOSFET 706 shorted, the current is clamped at about 26.36 A, which is bigger than with the PTC in series between the gate and source (FIG. 9). Thus, the PTC will have two effects. The first is to increase its resistance in response to the surge, and the second is to increase the gate-to-source voltage, $V_{GS}$, to a more negative level, which enhances the resistance of the MOSFET. This shows the advantage of using the PTC between the gate and source of the MOSFET, rather than simply connecting the gate and source terminals. Again, a thermal effect between the MOSFET and PTC are observed in both circuits 600 and 700. The above circuits may be tested with other input voltages, MOSFETs, PTC devices, and TVS diodes.

Figure 12:
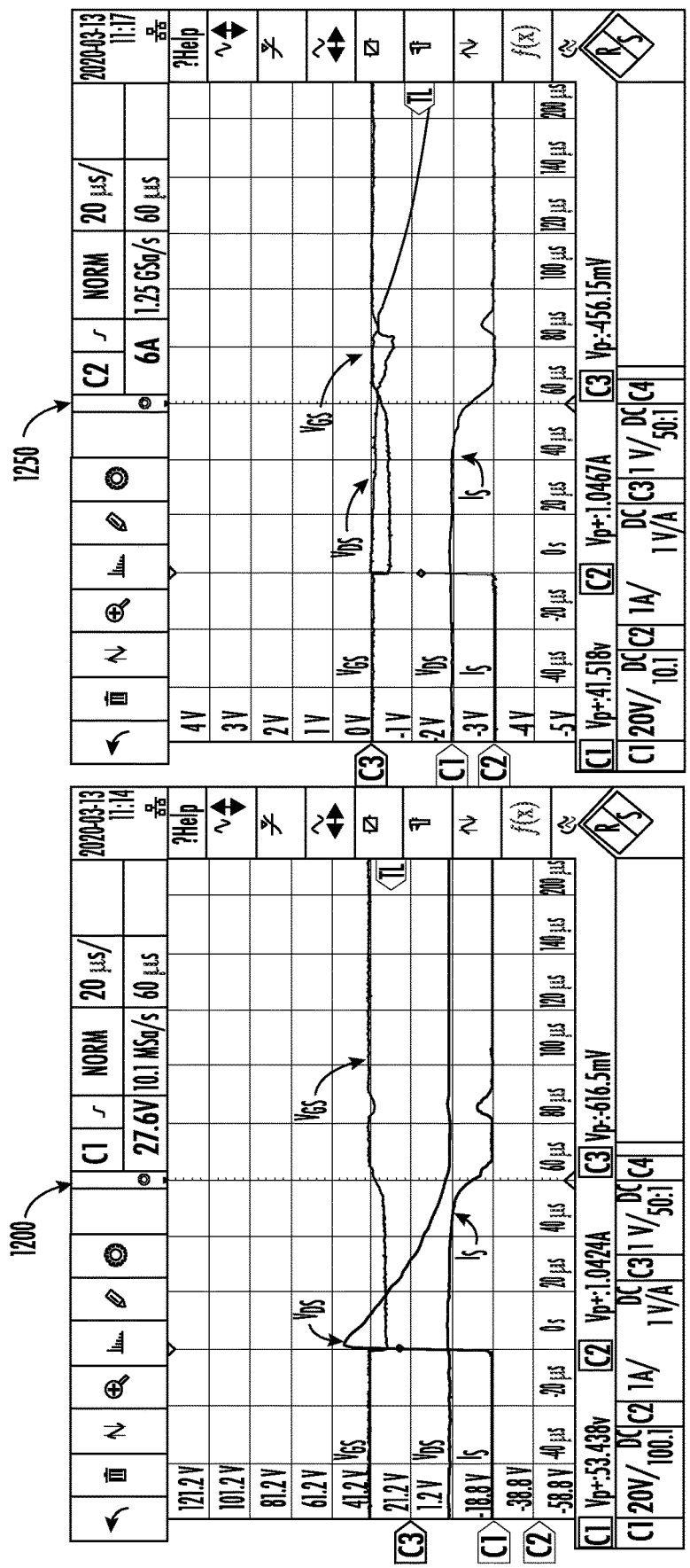

Results of empirical tests performed on the circuits 600 and 700 are given in the dual waveforms, respectively, of FIGS. 11 and 12, according to exemplary embodiments. In each of the dual waveforms, three parameters are featured, gate-to-source voltage ($V_{GS}$) of the MOSFET 606, the drain-to-source voltage ($V_{DS}$) of the MOSFET, and the surge current, Is, resulting from the input voltage, $V_{in}$. Put another way, the voltage across the MOSFET 606 ($V_{DS}$), the voltage across the PTC 608 ($V_{GS}$), resulting from the surge current, $I_S$, are measured. Both circuits 600 and 700 receive an input voltage, $V_{in}$ of 100V with a 1.2/50 µs surge.

In FIG. 11, waveform 1100 shows the result of applying a surge transient to the circuit 600 (FIG. 6) where the PTC 608 is an RXEF030 PTC device, manufactured by Littelfuse®. The RXEF030 device has a trip current, $I_T$, of 0.60 A, a minimum resistance, $R_{MIN}$, of 0.88 ohms, and a maximum resistance, $R_{MAX}$, of 1.33 ohms. The circuit 600 experiences the surge current, $I_S$, at trigger point, T (0 µs). The voltage between the drain and the source, $V_{DS}$, increases immediately, then decays over about 60 µs. Meanwhile, the gate-to-source voltage, $V_{GS}$, drops by about 20V, also very quickly. In the waveform 1100, the surge current, Is, lasts about 67 µs, which is considerably less than for the waveforms 300, 400, and 500.

The second waveform 1150 of FIG. 11 shows the result of applying a surge transient in the circuit 700 (FIG. 7) where the PTC 708 is also the RXEF030 PTC device and the TVS diode 710 is a 30KPA30CA diode. Here, the TVS diode 710 clamps the voltage through the MOSFET channel, $V_{DS}$, to below 40V. The duration of the surge current, $I_S$, is a little less than in the waveform 1100, at about 65 µs. Thus, in addition to clamping $V_{DS}$, the TVS diode 612 also has a positive affect by lowering the duration of the surge current, Is, relative to what was shown in waveform 1100.

In the waveforms 1100 and 1150, the voltage across the MOSFET 606, given by $V_{DS}$, is increasing quickly upon receipt of the surge current, Is, (although the voltage is clamped down by the TVS diode 708 in the waveform 1150). This almost instantaneous increase in voltage between the drain and source means the MOSFET 606 is heating up. Meanwhile, the voltage across the PTC 608, given by $V_{GS}$, is going down. However, by the end of the current surge, the PTC device 608 is heating up, as shown in the waveforms. Thus, the MOSFET 606 has a thermal effect on the PTC 608, which heating enables the circuit 600 to respond more quickly to the surge current.

Continuing to FIG. 12, waveform 1200 shows the result of applying a surge transient in the circuit 600 where the PTC 608 is an RXEF065 PTC device, also manufactured by Littelfuse®. The RXEF065 device has a trip current, $I_T$, of 1.30 A, a minimum resistance, $R_{MIN}$, of 0.31 ohms, and a maximum resistance, $R_{MAX}$, of 0.48 ohms. As before, the voltage between the drain and the source, $V_{DS}$, increases immediately while the gate-to-source voltage, $V_{GS}$, drops. The surge current, Is, lasts about 65 µs. Waveform 1150 shows the result of the surge transient in the circuit 700 where the PTC 708 is the RXEF065 PTC and the 30KPA30CA TVS diode 710 is used. This time, the duration of the surge current, $I_S$, is about 65 µs and the drain-to-source voltage of the MOSFET channel, $V_{DS}$, is clamped down by the TVS diode 710.

As with the circuit 600, the waveforms 1200 and 1250 illustrate that, in the circuit 700, the MOSFET 706 is heating due to the almost instantaneous increase in voltage, $V_{DS}$. While the PTC 708 is not initially heating up, the increase of $V_{GS}$ as the surge current, $I_S$, is coming down shows that the PTC 708 is being heated up by the thermal effect of its proximity to the MOSFET 706. This thermal effect makes the circuit 700 more responsive to the surge current, in some embodiments.

Two-Terminal Device Application

Figure 13:
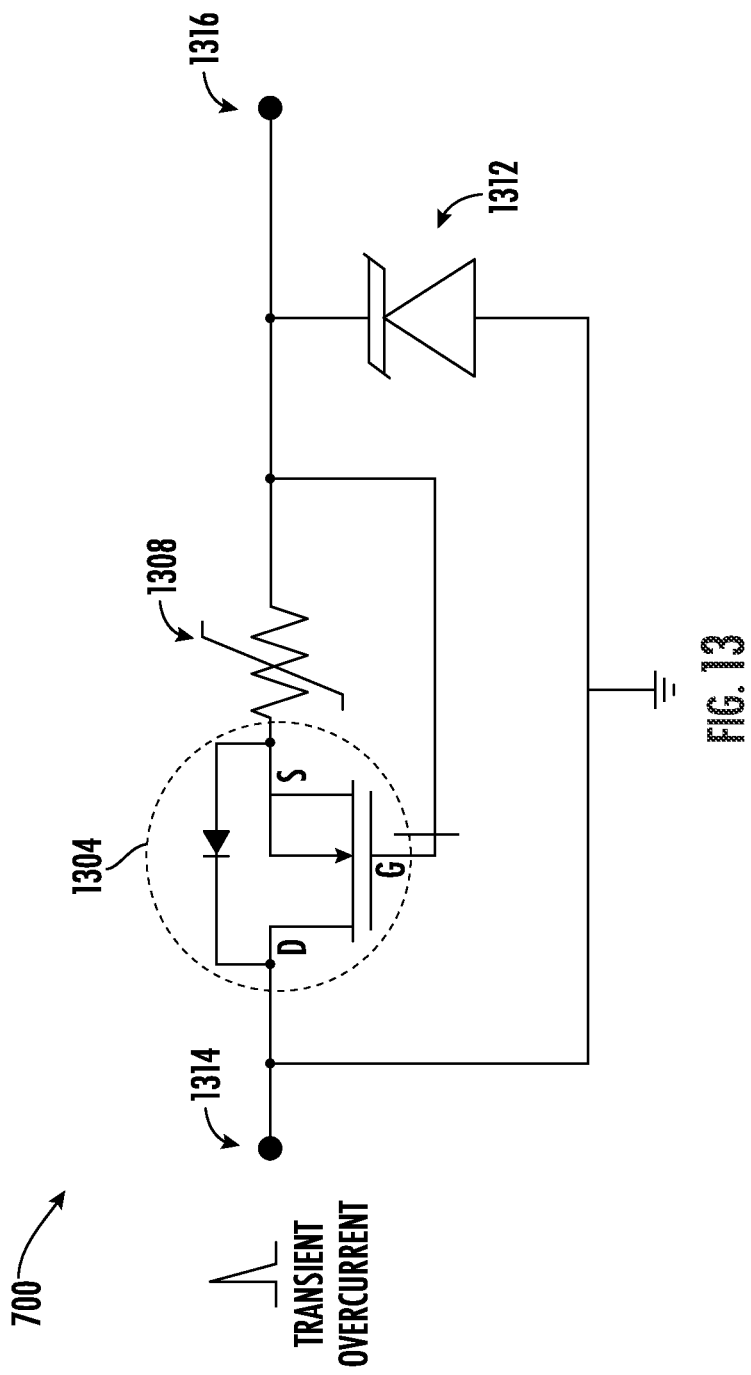
FIG. 13 is a diagram illustrating a two-terminal device for providing overcurrent protection, in accordance with exemplary embodiments.

FIG. 13 shows a representative drawing of a circuit 1300 for providing overcurrent protection, according to exemplary embodiments. The circuit 1300 features a depletion mode MOSFET 1304, a Positive Temperature Coefficient (PTC) device 1308, and a TVS diode 1312. As with the PTC devices 608 and 708 in the circuits 600 and 700, above, the PTC device 1308 is connected in series with the MOSFET 1304, between the source and the gate. Thus, the voltage across the PTC device is the same as the gate-source voltage, $V_{GS}$, of the MOSFET 1304. In one embodiment, the MOSFET 1304 is an n-channel depletion mode MOSFET. In an exemplary embodiment, the PTC device 1308 is a polymeric PTC (PPTC) device.

Because it is a depletion mode device, the MOSFET 1304 has a negative threshold voltage, $V_{TH}$. For a depletion mode MOSFET, the channel is fully conductive and current flows strongly between the drain and source when the gate terminal is at 0 volts ($V_{GS}$=0 volts). An increasingly negative bias at the gate of an N-channel MOSFET will reduce conduction in the channel, until finally $-V_{GS}$(off), the device's threshold voltage, $V_{TH}$, is reached, and conduction through the MOSFET ceases.

In between these two time periods (when $V_{GS}$=0 volts and when $V_{GS}$=$-V_{TH}$), the resistance across the channel of the MOSFET 1304 will increase. Thus, when a surge current is applied to the circuit 1300, the MOSFET 1304 will heat up quickly.

Similarly, the PTC device 1308 is designed to increase its resistance as it heats up. As current passing through the PTC device 1308, the PTC device temperature increases above a predefined limit, known as its breakpoint. This causes the resistance of the PTC device 1308 to increases dramatically, which reduce or arrest the flow of current through the PTC.

Further, the placement of the MOSFET 1304 and the PTC device 1308 next to one another means that, upon receipt of the surge current, the MOSFET 1304 will heat up, which will heat up the PTC device 1308 faster than if the MOSFET were not present. Thus, in some embodiments, there exists thermal transfer from the MOSFET 1304 to the PTC 1308, thus accelerating the response of both devices to the surge event.

As the PTC 1308 heats up, it becomes more resistant. A voltage develops across the PTC 1308, which will eventually exceed the threshold voltage, $V_{TH}$, of the MOSFET 1304 and cause the MOSFET to turn off.

Because the gate is tied to one side of the PTC 1308, there is no need to separately apply a voltage to the gate. In an exemplary embodiment, the circuit 1308 is packaged as a two-terminal device to be used as overcurrent protection in other circuits. Thus, a first terminal 1314 of the device 1300 is to be connected to a voltage source of the circuit to be protected while a second terminal 1316 is to be connected to a portion of the circuit to be protected (e.g., the downstream components of the circuit). In exemplary embodiments, the device 1300 protects against both constant overcurrent and transient overcurrent.

Bidirectional MOSFETs Circuit

Figure 14:
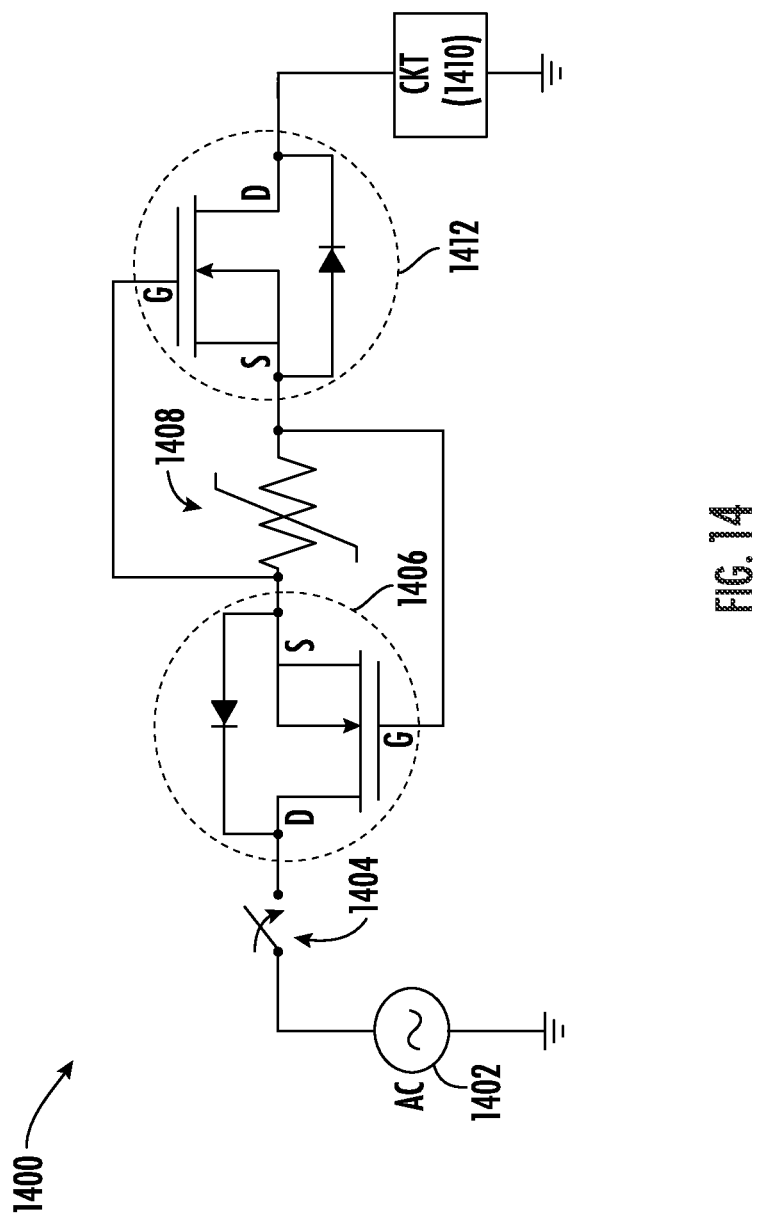
FIG. 14 is a diagram illustrating a bidirectional MOSFET circuit arrangement for providing overcurrent protection, in accordance with exemplary embodiments.

FIG. 14 is a representative drawing of a circuit 1400 including a pair of MOSFETs that provide bi-directional protection, coupled with a PTC device disposed between the two MOSFETS, in accordance with exemplary embodiments. The circuit 1400 includes a voltage input 1402, which is an AC input, a switch 1404, a first depletion mode MOSFET 1406, a PTC device 1408, a second depletion mode MOSFET 1412, and a CKT 1410. In one embodiment, the MOSFETs 1406 and 1412 are n-channel depletion mode MOSFETs connected in a back-to-back configuration. In an exemplary embodiment, the PTC device 1408 is a polymeric PTC (PPTC) device.

The PTC device 1408 is connected at a first end to the source of the MOSFET 1406 and at a second end to the gate of the same MOSFET, as before. With the introduction of the second MOSFET, the first end is connected to the gate of the MOSFET 1412 and the second end is connected to the source of the second MOSFET. With the circuit 1400 receiving an AC voltage input, either one of the MOSFETs is configured with its internal diode. When the positive cycle AC current flows to the circuit 1400, the first MOSFET 1406 and the PTC 1408 together act as a current limiter while the other MOSFET 1412 works in reverse mode so that only the body diode of the MOSFET 1412 conducts current. This operation is reversed when the other cycle of AC currents flows, that is, the MOSFET 1412 and the PTC 1408 together act as a current limiter and only the diode in MOSFET 1406 conducts current. Thus, this circuit 1400 provides AC current limiting protection. In one embodiment, the CKT 1410 is replaced with a bidirectional diode, for clamping down voltage across both the MOSFET 1412 and the MOSFET 1406. In a second embodiment the diode is a bidirectional TVS diode, thus protecting the surge current in both directions. Further, in one embodiment, since the RMS voltage multiplied by √2 is the DC peak voltage, the AC RMS voltage is limited to 17V maximum to make certain that the gate-to-source voltage, $V_{GS}$, will not exceed 25V (17V× 1.414=24V) during long-term overcurrent PTC trip.

Figure 15:
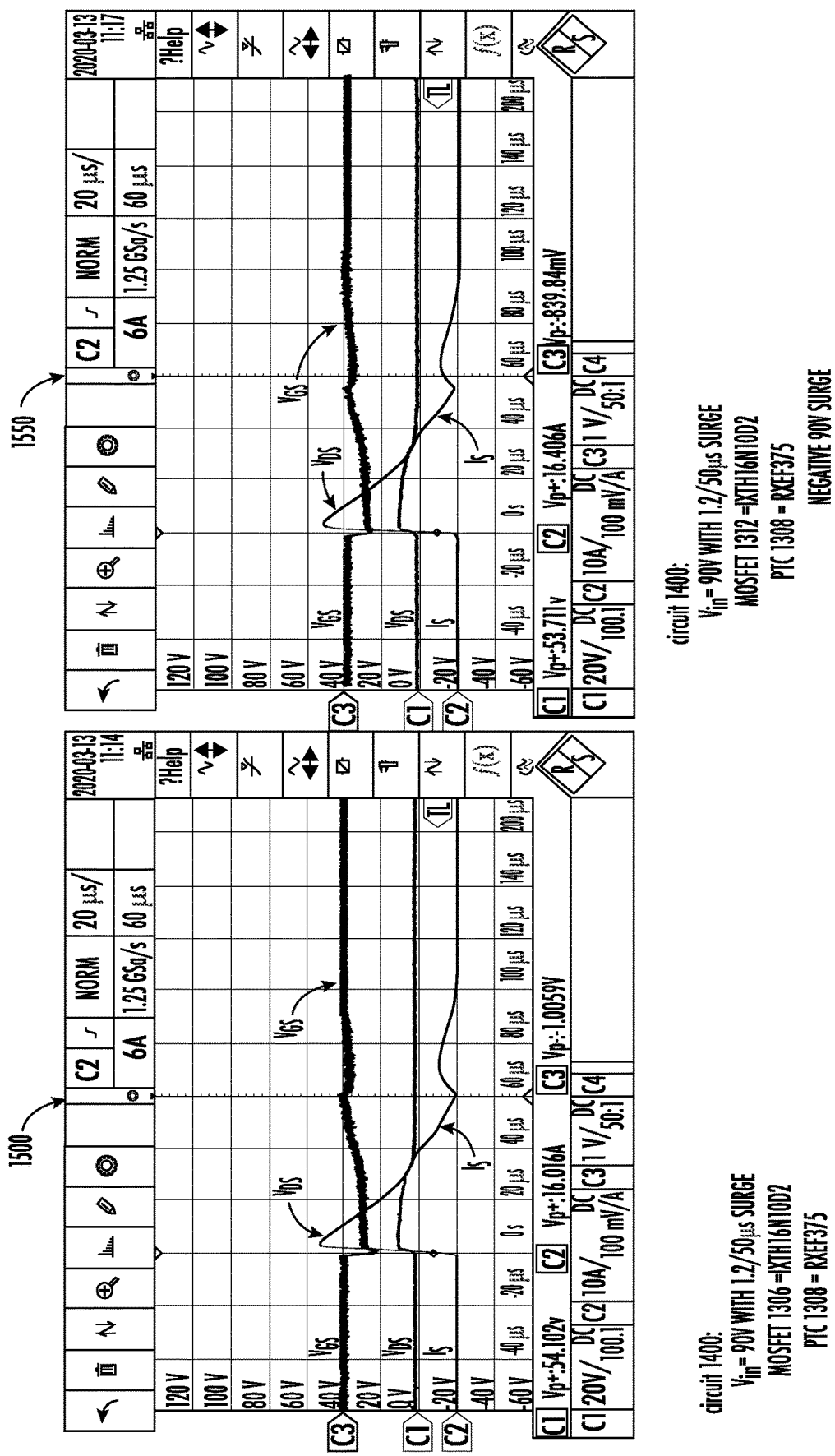
FIG. 15 is a diagram illustrating waveforms resulting from tests performed on the circuits of FIG. 14, in accordance with exemplary embodiments.

Results of empirical tests performed on the circuit 1400 is given in the dual waveforms of FIG. 15, according to exemplary embodiments. The circuit 1400 receives an input voltage, $V_{in}$ of 90V with a 1.2/50 μs surge. The AC RMS voltage is limited to 17V max to ensure that the $V_{GS}$ voltage will not exceed 25V during long-term overcurrent PTC trip. Both MOSFETs 1406 and 1412 are IXTH16N10D2, manufactured by Littelfuse® (with $V_{DS}$=100V, $I_{D(on)}$=16 A, $R_{DS(on)}$=64 mOhm in mounting torque TO-247) and the PTC device 1408 is an RXEF375, with a maximum resistance, $R_{MAX}$, of 0.05 ohms.

In the waveform 1500, three parameters are featured, gate-to-source voltage ($V_{GS}$) of the MOSFET 1306, the drain-to-source voltage ($V_{DS}$) of the MOSFET, and the surge current, Is, resulting from the input voltage, $V_{in}$. Put another way, the voltage across the MOSFET 1406 ($V_{DS}$), the voltage across the PTC 1408 ($V_{GS}$), resulting from the surge current, Is, are measured. In the waveform 1450, the gate-to-source voltage ($V_{GS}$) of the MOSFET 1412, the drain-to-source voltage ($V_{DS}$) of the MOSFET, and the surge current, $I_s$, resulting from the input voltage, $V_{in}$. Put another way, the voltage across the MOSFET 1412 ($V_{DS}$), the voltage across the PTC 1408 ($V_{GS}$), resulting from the surge current, Is, are measured. Thus, the voltage across the PTC 1408 is the gate-to-source voltage of both MOSFETs 1406 and 1412.

The waveforms 1500 and 1550 are almost identical. Thus, there is almost symmetry between them. This indicates that the back-to-back MOSFET plus PTC configuration of the circuit 1400 provides AC power protection.

The above embodiments in some cases contemplate specific versions of depletion mode MOSFETs, PTC devices, and TVS diodes. Nevertheless, other devices may be used in one or more of the above-described circuits to provide overcurrent protection for a variety of different applications. In some embodiments, N-channel depletion mode MOSFETs IXTT16N10D2 or IXTH16N10D2, having parameters $V_{DSX}$=100V, $I_{D(on)}$≥16 A, and $R_{DS(on)}$≤64 mohms, are used for the MOSFETs. In some embodiments, N-channel depletion mode MOSFETs IXTY08N50D2, IXTA08N50D2, or IXTP08N50D2, manufactured by Littelfuse®, having parameters $V_{DSX}$=500V, $I_{D(on)}$≥800 mA, and $R_{DS(on)}$≤4.6 ohms, are used for the MOSFETs. In some embodiments, N-channel depletion mode MOSFETs IXTH16N50D2 or IXTT16N50D2, having parameters $V_{DSX}$=500V, $I_{D(on)}$≥16 A, and $R_{DS(on)}$≤300 mohms, are used for the MOSFETs.

Further, in some embodiments, Poly-Fuse® Radial Leaded Resettable PTCs in the 72R series, manufactured by Littelfuse®, are used for the PTC devices. In some embodiments, Polyswitch® Radial Leaded Resettable PPPTs in the RXEF series, manufactured by Littelfuse®, are used for the PTC devices. In some embodiments, Axial Leaded Transient Voltage Suppression Diodes of the 30KPA series, manufactured by Littelfuse®, are used for the TVS diodes. The use of other devices, whether manufactured by Littelfuse® or other device manufacturers, may be contemplated without departing from the spirit of this disclosure.

In exemplary embodiments, the introduction of a PTC device, it was shown that a depletion mode MOSFET connected with the PTC device work together to limit overcurrent in both transient and continuous conditions. In one embodiment, the combination of MOSFET with PTC in a circuit, as illustrated above, works at below 30V, as this is below the maximum gate-to-source voltage, $V_{GS}$, of the MOSFET and the maximum PTC operating voltage. In another embodiment, to prevent damage to the depletion mode MOSFET, the input voltage range is limited to between 5 and 24V, which is the functional operating voltage level. In another embodiment, adding a heatsink to the depletion mode MOSFET can extend the thermal performance of the MOSFEET, as the presence of the heatsink improves the overall thermal impedance.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A circuit operable to provide overcurrent protection, the circuit comprising:
    a metal oxide semiconductor field effect transistor (MOSFET), the MOSFET comprising a first internal diode;
    a Positive Temperature Coefficient (PTC) device having two terminals, a first terminal being directly connected to a source of the MOSFET and a second terminal being directly connected to a gate of the MOSFET;
    a second MOSFET directly connected to the PTC device, the second MOSFET comprising a second internal diode, wherein a gate of the second MOSFET is directly connected to the first terminal and a source of the second MOSFET is directly connected to the second terminal; and
    a bidirectional diode to clamp down drain-to-source voltage, $V_{DS}$, across the first MOSFET and the second MOSFET.

2. The circuit of claim 1, further comprising a voltage source, wherein the voltage source is an AC voltage source.

3. The circuit of claim 1, wherein the MOSFET and the second MOSFET are n-channel depletion mode MOSFETs.

* * * * *